US009523434B2

(12) United States Patent
Nagahama

(10) Patent No.: US 9,523,434 B2
(45) Date of Patent: Dec. 20, 2016

(54) FLOW PASSAGE SWITCHING VALVE

(71) Applicant: FUJIKOKI CORPORATION, Tokyo (JP)

(72) Inventor: Kenichiro Nagahama, Tokyo (JP)

( * ) Notice: Subject to any disclaimer, the term of this patent is extended or adjusted under 35 U.S.C. 154(b) by 0 days.

(21) Appl. No.: 14/693,135

(22) Filed: Apr. 22, 2015

(65) Prior Publication Data

US 2015/0316156 A1 Nov. 5, 2015

(30) Foreign Application Priority Data

Apr. 30, 2014 (JP) ................................. 2014-093812

(51) Int. Cl.
*F16K 11/085* (2006.01)
*F16K 5/04* (2006.01)

(52) U.S. Cl.
CPC ........... *F16K 5/0407* (2013.01); *F16K 5/0471* (2013.01); *F16K 11/0853* (2013.01); *Y10T 137/86863* (2015.04)

(58) Field of Classification Search
USPC .................................................. 137/625.47
See application file for complete search history.

(56) References Cited

U.S. PATENT DOCUMENTS

| 275,406 | A | * | 4/1883 | Parsons | F16K 11/0853 |
| | | | | | 137/625.47 |
| 839,188 | A | * | 12/1906 | Obertop | F16K 7/06 |
| | | | | | 137/595 |
| 872,494 | A | * | 12/1907 | Blackburn | B08B 9/0433 |
| | | | | | 134/103.1 |
| 1,327,831 | A | * | 1/1920 | Little | F16K 11/0853 |
| | | | | | 122/15.1 |
| 1,534,958 | A | * | 4/1925 | Huss | F16K 11/0853 |
| | | | | | 137/625.47 |
| 1,840,631 | A | * | 1/1932 | Maguire | E03B 9/20 |
| | | | | | 137/625.47 |
| 2,439,515 | A | * | 4/1948 | Hodgson | B63H 21/22 |
| | | | | | 137/625.24 |
| 2,485,842 | A | * | 10/1949 | Pennington | A61M 39/223 |
| | | | | | 137/625.19 |

(Continued)

FOREIGN PATENT DOCUMENTS

DE 1234467 2/1967
FR 584483 2/1925

(Continued)

OTHER PUBLICATIONS

Extended European Search Report in corresponding European Application No. 15165162.7, issued Sep. 25, 2015.

*Primary Examiner* — John Fox
(74) *Attorney, Agent, or Firm* — Bacon & Thomas, PLLC

(57) ABSTRACT

There is provided a flow passage switching valve that can individually perform the flow control of flow passages of a system including a plurality of flow passages while reducing the number of parts. A first flow passage in which a first inlet and a first outlet formed at a valve body communicate with each other through communication holes of a cylindrical valve element portion of a valve element and a second flow passage in which a second inlet and a second outlet communicate with each other through the communication holes of the cylindrical valve element portion are switched according to a change of a rotational position of the valve element.

6 Claims, 17 Drawing Sheets

(56) References Cited

U.S. PATENT DOCUMENTS

| | | | | |
|---|---|---|---|---|
| 2,938,544 A | * | 5/1960 | Simpson | F16K 11/0853 137/625.47 |
| 2,987,076 A | * | 6/1961 | Alderman | F16K 11/0853 137/599.03 |
| 3,048,192 A | * | 8/1962 | Murphy, Jr | A61M 39/223 137/625.42 |
| 3,166,098 A | * | 1/1965 | Jennings | F16K 11/0873 137/625.43 |
| 3,227,312 A | * | 1/1966 | Solvik | F16K 5/0207 222/52 |
| 3,626,938 A | * | 12/1971 | Versaci | A61M 1/3655 137/625.47 |
| 3,927,693 A | * | 12/1975 | Johnston | F16K 11/00 137/625.47 |
| 4,215,847 A | * | 8/1980 | Hoos | F16K 5/0471 251/309 |
| 4,410,003 A | * | 10/1983 | Sandling | F16K 5/0271 137/312 |
| 4,467,832 A | * | 8/1984 | Tamamori | F16K 5/0207 137/625.47 |
| 4,494,730 A | * | 1/1985 | George | F16K 5/025 251/309 |
| 2005/0006150 A1 | | 1/2005 | Sims et al. | |
| 2011/0011474 A1 | | 1/2011 | Duncan | |

FOREIGN PATENT DOCUMENTS

| | | |
|---|---|---|
| GB | 548631 | 10/1942 |
| JP | H08145206 A | 6/1996 |

* cited by examiner

FIG. 5
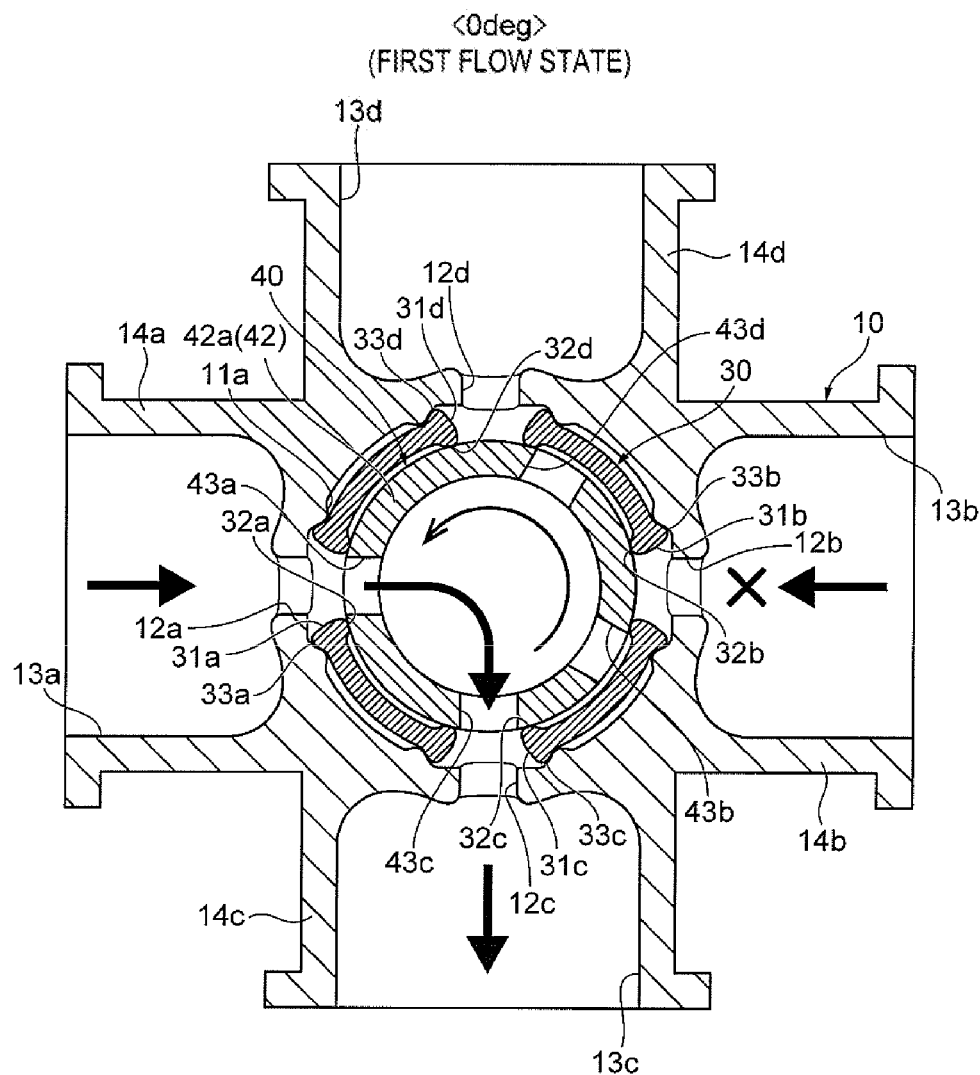
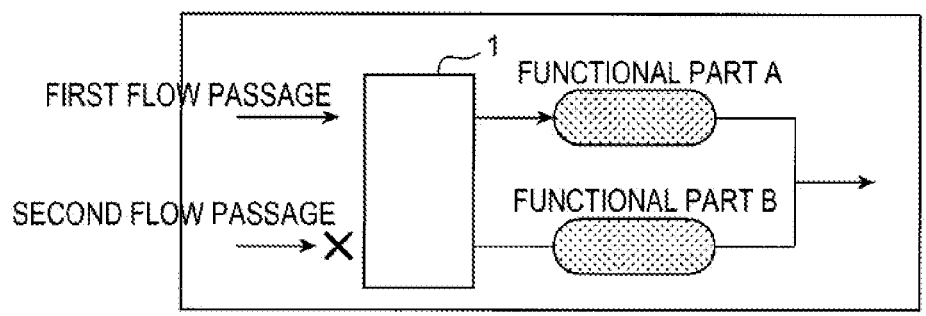

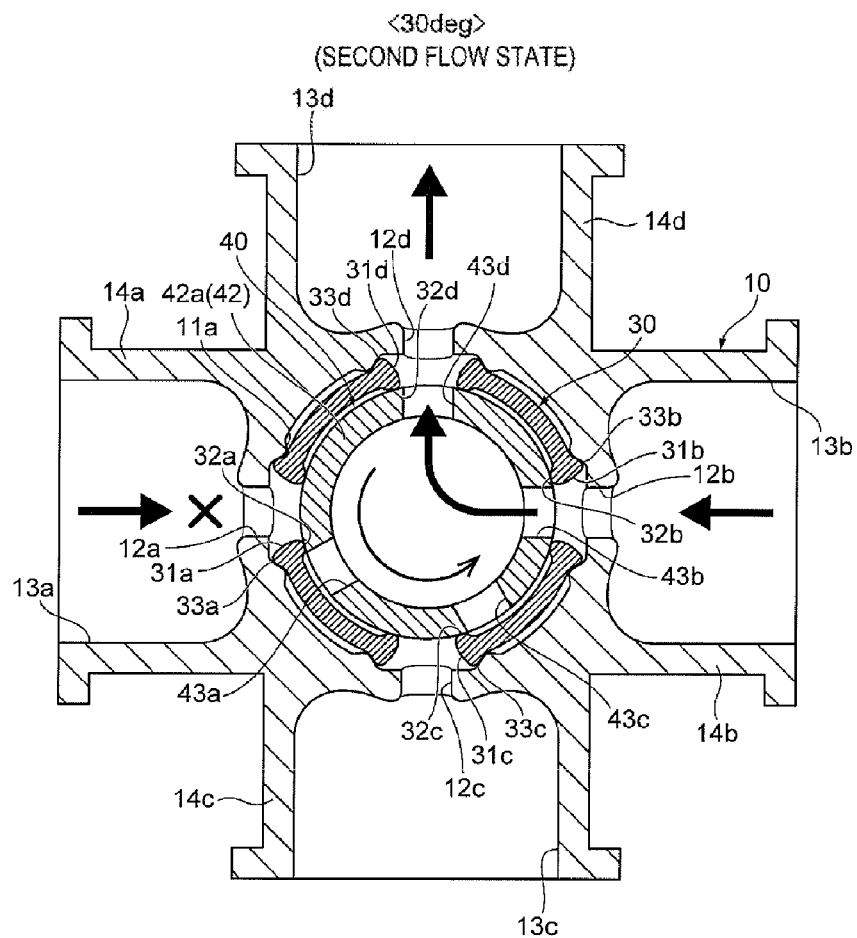
FIG. 6
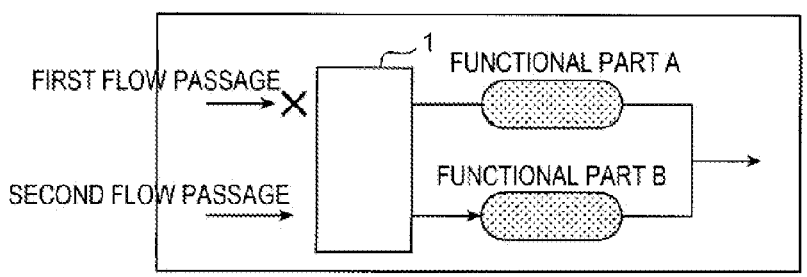

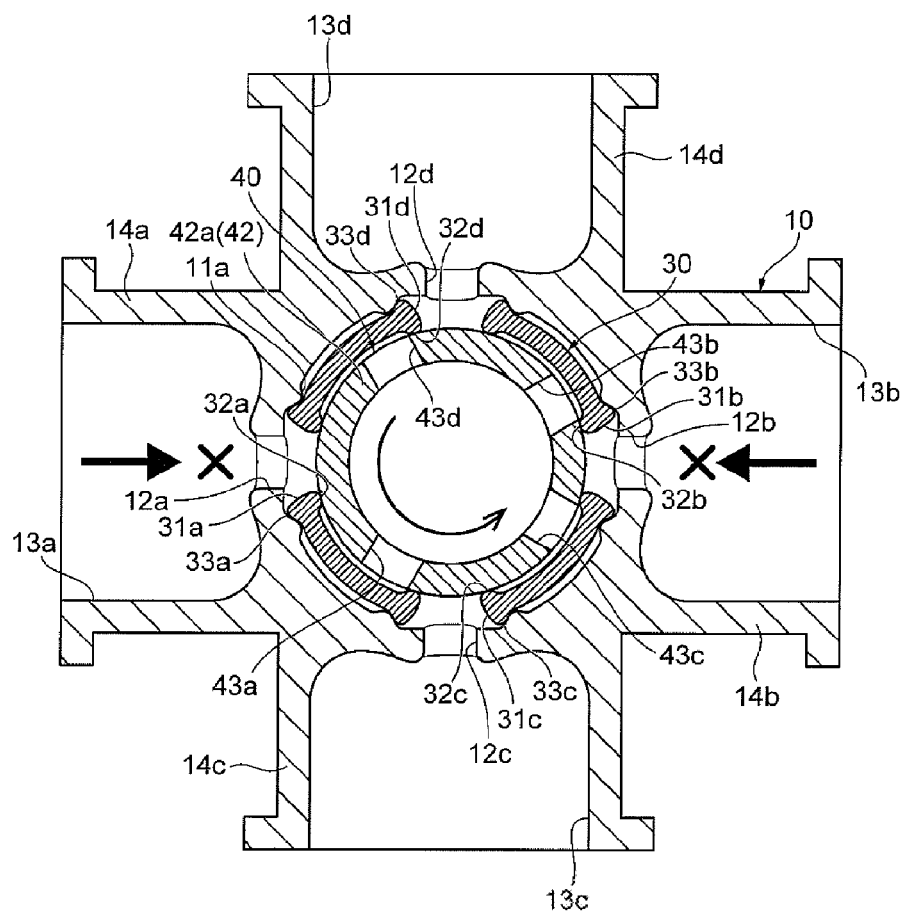
FIG. 7
⟨60deg⟩
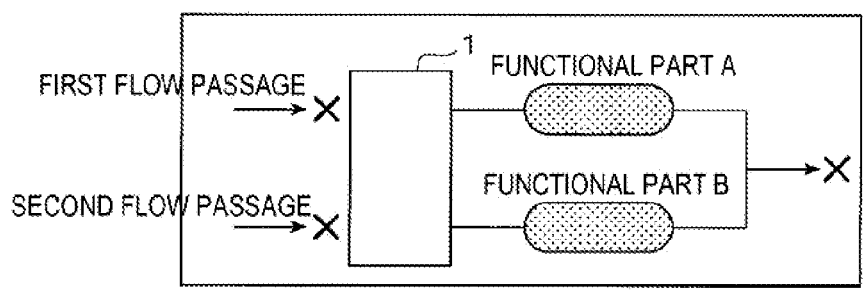

<0deg>
(FIRST FLOW STATE)

<60deg>

⟨45deg⟩

<0deg>
(FIRST FLOW STATE)

⟨45deg⟩

FLOW PASSAGE SWITCHING VALVE

BACKGROUND OF THE INVENTION

1. Field of the Invention

The present invention relates to a flow passage switching valve, and more particularly, to a flow passage switching valve that can easily switch, for example, a plurality of flow passages.

2. Description of the Related Art

In the past, a technique disclosed in JP 8-145206 A has been known as the related art that controls the opening/closing of a valve and the opening of the valve by rotating a valve disposed in a valve chest.

A ball valve disclosed in JP 8-145206 A is adapted so that a cassette type valve element is detachably fitted and fixed to a valve box of a valve body including an inlet and an outlet for fluid on both sides thereof and a ball valve part assembled in a cylindrical body of the valve element is opened and closed by a valve stem engaged with a ball top end through the valve box and the cylindrical body. Further, a pair of seal members, which support the ball valve part so as to allow the ball valve part to be rotatable and block the flow of fluid between the ball valve part and the cylindrical body, is provided at inner positions on one opening end side and the other opening end side of the cylindrical body.

SUMMARY OF THE INVENTION

Incidentally, there is known the following hot-water supply system. The hot-water supply system heats feed water (tap water) to a predetermined temperature by heating means, such as a heat pump unit, and stores the heated feed water in a tank (that circulates the water to keep the water at a predetermined temperature); distributes hot water of the tank to hot-water inlets of respective mixing valves for a bath (bathroom), a hot-water supply (kitchen), room heating, and the like through pipes; distributes feed water (tap water) to water inlets of the respective mixing valves through pipes; adjusts a mixing ratio of water and heated water so that hot water having a desired temperature is obtained at the respective mixing valves; and supplies water and heated water to required places from outlets of the respective mixing valves through pipes. It is desired that flow passages, such as a flow passage in which heated feed water flows and a flow passage in which non-heated feed water flows, are individually controlled in the hot-water supply system. Specifically, it is desired to individually control the respective flow passages by blocking the flow passage in which non-heated feed water (tap water) flows so that only heated feed water (tap water) is allowed to flow (mode 1), blocking the flow passage in which heated feed water (tap water) flows so that only non-heated feed water (tap water) is allowed to flow (mode 2), or blocking both the flow passages (mode 3) as illustrated in FIG. 17.

However, it is necessary to install the ball valve on each flow passage as illustrated in FIG. 17 in order to individually perform the flow control of the respective flow passages by using, for example, the ball valve in the related art in the hot-water supply system that is provided with a plurality of such flow passages. For this reason, there is a problem in that the number of parts increases.

The invention has been made in consideration of the above-mentioned problem, and an object of the invention is to provide a flow passage switching valve that can individually perform the flow control of flow passages of a system including a plurality of flow passages while reducing the number of parts.

In order to solve the problem, according to an aspect of the invention, there is provided a flow passage switching valve including: a valve body that includes a valve chest formed therein and first and second inlets and first and second outlets communicating with the valve chest and formed at an outer peripheral portion thereof; a valve element including a cylindrical valve element portion that is rotatably received in the valve chest and includes a plurality of communication holes formed at an outer peripheral portion thereof in a circumferential direction; and a rotating drive unit that rotates the valve element about an axis thereof. A first flow passage in which the first inlet and the first outlet communicate with each other through the communication holes and a second flow passage in which the second inlet and the second outlet communicate with each other through the communication holes are switched according to a change of a rotational position of the valve element.

In a preferred aspect, the first inlet, the first outlet, and two communication holes selected from the plurality of communication holes, and the second inlet, the second outlet, and two communication holes formed of communication holes, which are selected from the plurality of communication holes and are the same as or different from the two communication holes, are formed at the same angular interval in the circumferential direction.

In a more preferred aspect, the number of all the communication holes is four.

In a more preferred aspect, the first inlet, the first outlet, and two communication holes of the plurality of communication holes, and the second inlet, the second outlet, and two communication holes different from the two communication holes are provided at the same angular interval in the circumferential direction.

In a more preferred aspect, the angular interval is 90° or 180°.

In another preferred aspect, the number of all the communication holes is two.

In a more preferred aspect, the first inlet, the first outlet, the second inlet, the second outlet, and the two communication holes are provided at the same angular interval in the circumferential direction.

In a more preferred aspect, the angular interval is 90° or 180°.

In another preferred aspect, the communication hole, and/or the first and second inlets and the first and second outlets are formed in a vertically long shape of which a length in an axial direction is longer than a length in the circumferential direction.

In another preferred aspect, a seal member is provided between the cylindrical valve element portion and the valve body.

In a more preferred aspect, the seal member is formed of one annular member that includes through holes formed at positions corresponding to the first and second inlets and the first and second outlets.

In a more preferred aspect, outer ribs are formed on the seal member along peripheries of the through holes so as to protrude outward from the outer peripheral surface of the seal member, and protrusions, which come into contact with the outer ribs, are provided on an inner wall surface of the valve body.

According to the flow passage switching valve of the aspect of the invention, the first flow passage in which the first inlet and the first outlet formed at the valve body communicate with each other through the communication holes of the valve element and the second flow passage in which the second inlet and the second outlet communicate with each other through the communication holes of the valve element are switched according to the change of the rotational position of the valve element that is rotationally driven by the rotating drive unit. Accordingly, it is possible to individually perform the flow control of flow passages of a system, which is provided with the plurality of flow passages, by a simple structure.

Further, the communication holes, which are formed at the cylindrical valve element portion of the valve element, and the first and second inlets and the first and second outlets, which are formed at the valve body, are formed in a vertically long shape of which a length in an axial direction is longer than a length in a circumferential direction. Accordingly, even when the first and the second flow passages are switched, it is possible to make the first inlet and the first outlet of the first flow passage reliably communicate with each other and to make the second inlet and the second outlet of the second flow passage reliably communicate with each other. As a result, it is possible to reliably perform the flow control of each flow passage.

Furthermore, the seal member, which is provided between the cylindrical valve element portion and the valve body, is formed of one annular member that includes through holes formed at positions corresponding to the first and second inlets and the first and second outlets. Accordingly, it is possible to significantly reduce assembling man-hours and the number of parts of the flow passage switching valve.

BRIEF DESCRIPTION OF THE DRAWINGS

FIG. 5 is a cross-sectional view illustrating a method of switching flow passages by the flow passage switching valve illustrated in FIG. 1, and is a view illustrating a first flow state;

FIG. 6 is a cross-sectional view illustrating the method of switching flow passages by the flow passage switching valve illustrated in FIG. 1, and is a view illustrating a second flow state;

FIG. 7 is a cross-sectional view illustrating the method of switching flow passages by the flow passage switching valve illustrated in FIG. 1, and is a view illustrating a state in which both flow passages are closed;

DETAILED DESCRIPTION OF THE PREFERRED EMBODIMENTS

Flow passage switching valves according to embodiments of the invention will be described below with reference to the drawings.

[First Embodiment]

Figure 1:
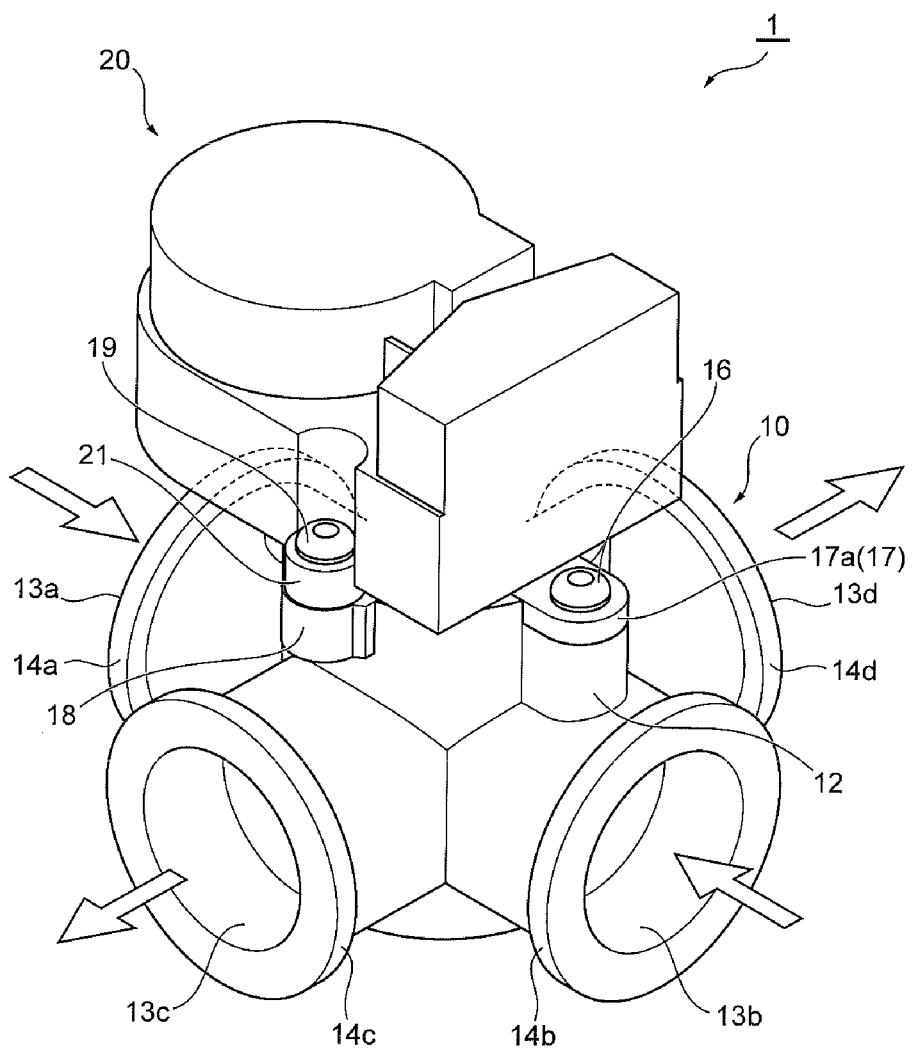
FIG. 1 is a perspective view illustrating the entire structure of a flow passage switching valve according to a first embodiment of the invention.
Figure 2:
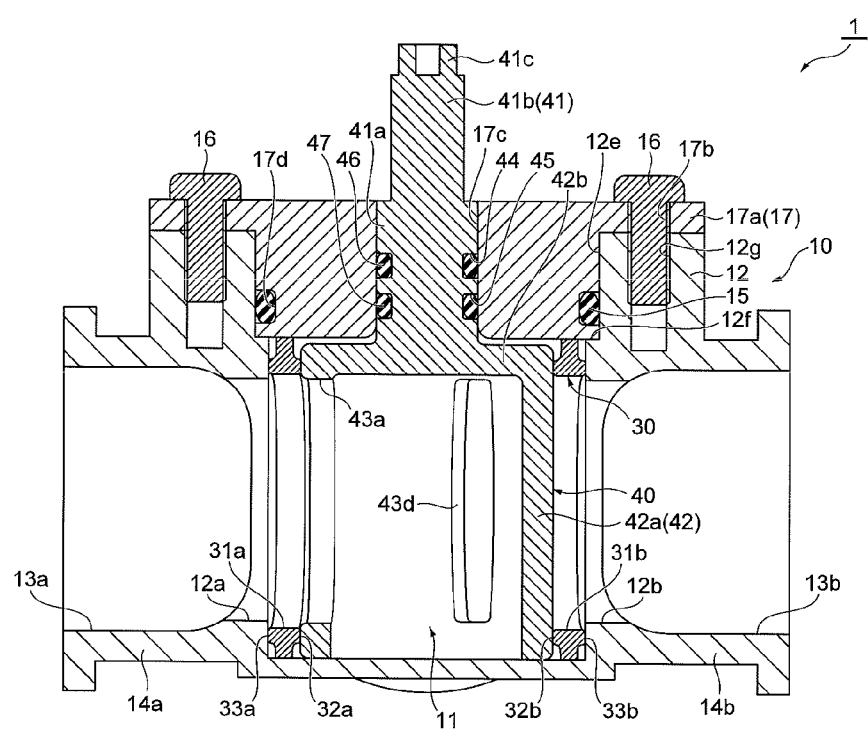
FIG. 2 is a longitudinal sectional view of the flow passage switching valve illustrated in FIG. 1.
Figure 3:
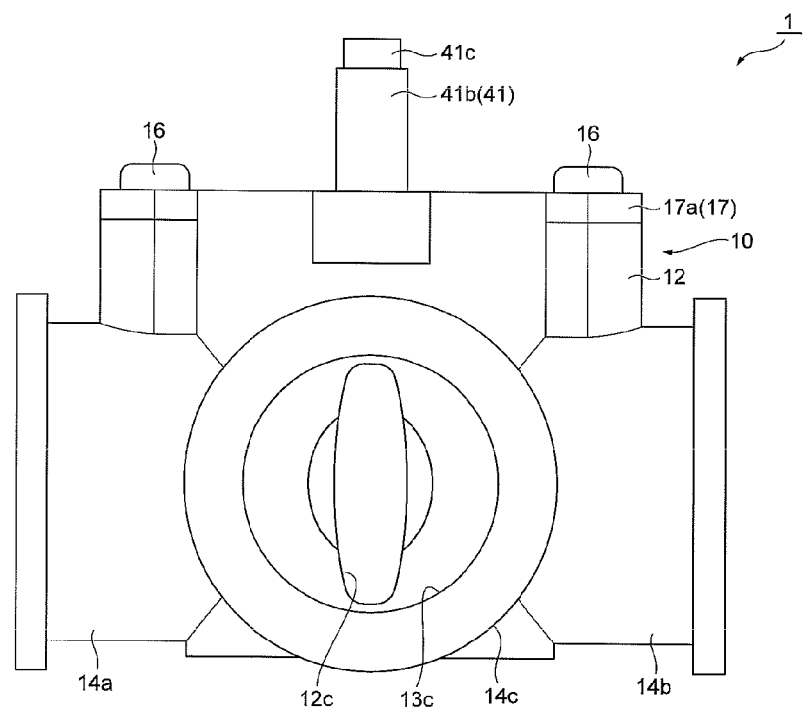
FIG. 3 is a front view of the flow passage switching valve illustrated in FIG. 1.
Figure 4:
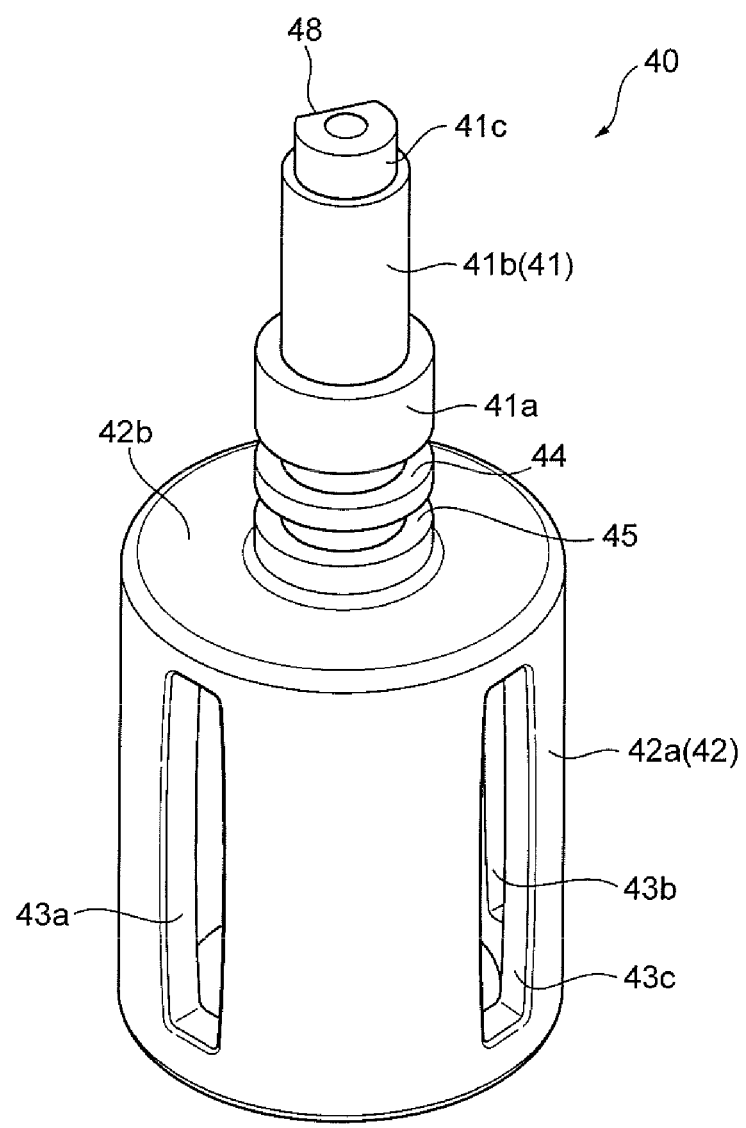
FIG. 4 is a perspective view of a valve element illustrated in FIG. 2.

FIG. 1 is a perspective view illustrating the entire structure of a flow passage switching valve according to a first embodiment of the invention, FIG. 2 is a longitudinal sectional view of the flow passage switching valve illustrated in FIG. 1, FIG. 3 is a front view of the flow passage switching valve illustrated in FIG. 1, and FIG. 4 is a perspective view of a valve element illustrated in FIG. 2. Further, FIGS. 5 to 7 are cross-sectional views illustrating a method of switching flow passages by the flow passage switching valve illustrated in FIG. 1, and are views illustrating a first flow state, a second flow state, and a state in which both flow passages are closed, respectively. Meanwhile, a motor as a rotating drive unit is not illustrated in FIGS. 2 and 3. The illustrated flow passage switching valve 1 is used as a switching valve for switching each flow passage in a hot-water supply system that is provided with a plurality of flow passages, such as a flow passage in which heated feed water (tap water) flows and a flow passage in which unheated feed water (tap water) flows.

The illustrated flow passage switching valve 1 mainly includes a valve body 10 that is made of a resin and includes a valve chest 11, a motor (rotating drive unit) 20 that is disposed on the valve body 10, a seal member 30 as a valve seat that is disposed in the valve chest 11 of the valve body 10, and a valve element 40 that is made of a resin and includes a valve stem 41 connected to an output shaft of the motor 20 and a cylindrical valve element portion 42 received in an area surrounded by the seal member 30.

The valve body 10 made of a resin mainly includes a bottomed cylindrical base 12 and an upper cover 17.

The valve chest 11 formed of a cylindrical space is formed in the bottomed cylindrical base 12, an upper surface of the bottomed cylindrical base 12 is opened so as to communicate with the valve chest 11, and four openings are formed at an outer peripheral portion of the bottomed cylindrical base 12 so as to communicate with the valve chest 11. The four lateral openings formed at the outer peripheral portion of the bottomed cylindrical base 12 are formed at regular intervals (at intervals of 90°) in a circumferential direction, and two openings formed at positions facing each other (at angular intervals of 180°) are first and second inlets 12a and 12b and first and second outlets 12c and 12d, respectively (see FIG. 5). Further, conduit couplings 14a to 14d, which include inflow passages 13a and 13b and outflow passages 13c and 13d communicating with the inlets 12a and 12b and the outlets 12c and 12d, are integrally formed at the outer peripheral portion of the bottomed cylindrical base 12. Each of the inflow passages 13a and 13b and the outflow passages 13c and 13d are formed so as to have a substantially circular cross-section, and each of the inlets 12a and 12b and the outlets 12c and 12d is formed in a vertically long shape of which a length in an axial direction is longer than a length in a circumferential direction (see FIG. 3).

The upper cover 17 functions as a holder that holds the valve stem 41 of the valve element 40, and an upper opening 12e of the bottomed cylindrical base 12 is formed stepwise. The upper cover 17 is formed so as to have the same diameter as an upper large-diameter portion of the upper opening 12e, and mounting portions 17a including female screw portions 17b are formed at an upper end of the upper cover 17 so as to protrude outward to the right and left. Further, a longitudinal insertion hole 17c into which (a lower large-diameter portion 41a of) the valve stem 41 of the valve element 40 is rotatably inserted is formed substantially at the center of the upper cover 17. A O-ring 15 is mounted in an annular groove 17d, which is formed on the outer periphery of the upper cover 17, to seal a gap formed between the upper opening 12e and the upper covers 17; the upper cover 17 is fitted to the upper opening 12e so that the outer edge of the lower surface of the upper cover 17 comes into contact with a stepped portion 12f of the upper opening 12e and the lower surfaces of the mounting portions 17a of the upper cover 17 come into contact with the upper surface of the bottomed cylindrical base 12; and fastening bolts 16 are threadedly engaged with the female screw portions 17b of the mounting portions 17a and female screw portions 12g formed on the upper surface of the bottomed cylindrical base 12. Accordingly, the mounting portions 17a of the upper cover 17 are fastened and fixed to the bottomed cylindrical base 12 by a plurality of (two (right and left) in the embodiment illustrated in FIGS. 1 to 7) fastening bolts 16. Therefore, since the upper cover 17 is assembled to the bottomed cylindrical base 12, the valve chest 11 is formed below the upper cover 17.

The seal member 30 is received in the valve chest 11 to support the cylindrical valve element portion 42 of the valve element 40 and to seal a gap between the cylindrical valve element portion 42 and the valve body 10. The seal member 30 is formed of an annular resin member, and is provided with through holes 31a to 31d. The through holes 31a to 31d are larger than the inlets 12a and 12b and the outlets 12c and 12d, respectively, and are formed at positions corresponding to the first and second inlets 12a and 12b and the first and second outlets 12c and 12d of the valve body 10 (at regular intervals (at intervals of 90°) in the circumferential direction). Furthermore, inner ribs 32a to 32d that are formed along the peripheries of the respective through holes 31a to 31d so as to protrude inward from the inner peripheral surface of the seal member 30 in a radial direction, and outer ribs 33a to 33d are formed along the peripheries of the respective through holes 31a to 31d so as to protrude outward from the outer peripheral surface of the seal member 30 in the radial direction. The seal member 30 is disposed between the cylindrical valve element portion 42 and the valve body 10 in the valve chest 11 so that the inner ribs 32a to 32d come into contact with the cylindrical valve element portion 42 and the outer ribs 33a to 33d come into contact with the inner wall surface of the valve body 10. Meanwhile, the height of the seal member 30 in a longitudinal direction (the height of the seal member 30 in a vertical direction) is designed so as to substantially correspond to a distance between the ceiling surface (the lower surface of the upper cover 17) and the lower surface of the valve chest 11.

Moreover, a plurality of (eight in the embodiment illustrated in FIGS. 1 to 7) protrusions 11a extending in the longitudinal direction are formed on the inner wall surface of the valve body 10, which forms the valve chest 11, to position the seal member 30 in the valve chest 11 of the valve body 10 and to prevent the rotation of the seal member 30 caused by the rotational drive of the valve element 40. The seal member 30 is disposed between the cylindrical valve element portion 42 and the valve body 10 in the valve chest 11 so that the outer peripheral portions of the outer ribs 33a to 33d come into contact with the protrusions 11a formed on the inner wall surface of the valve chest 11, respectively (see FIG. 5).

Meanwhile, the seal member 30 is made of an elastic material, for example, synthetic rubber, such as nitrile rubber (NBR), hydrogenated nitrile rubber (H-NBR), silicone rubber, urethane rubber, acrylic rubber (ACM), butadiene rubber (BR), styrene-butadiene rubber (SBR), fluororubber (FKM), or ethylene-propylene rubber (EPM, EPDM), other than natural rubber. Particularly, it is preferable that the seal member 30 be made of ethylene-propylene rubber (EPM, EPDM).

The valve element 40 made of a resin includes the cylindrical valve element portion 42 that is received in an area surround by the seal member 30 and includes a ceiling, and the valve stem 41 that extends upward from a substantially central portion of the ceiling 42b of the cylindrical valve element portion 42 and is inserted into the insertion hole 17c of the upper cover 17.

The cylindrical valve element portion 42 is received in the valve chest 11 so that an outer peripheral surface of the cylindrical valve element portion 42 comes into contact with the inner ribs 32a to 32d of the seal member 30 and the cylindrical valve element portion 42 is rotatable about an axis thereof. Four communication holes 43a to 43d are formed on the outer peripheral portion 42a of the cylindrical valve element portion 42 in the circumferential direction. Each of the lateral communication holes 43a to 43d is smaller than each of the through holes 31a to 31d of the seal member 30, and is formed in a vertically long shape of which a length in the axial direction is longer than a length in the circumferential direction, like each of the inlets 12a and 12b and the outlets 12c and 12d. Further, the respective communication holes 43a to 43d are formed so that angular intervals between the adjacent communication holes are not equal to each other (different from each other) (in the embodiment illustrated in FIGS. 1 to 7, the angular interval between one communication hole and one adjacent communication hole is 90° and the angular interval between one communication hole and the other adjacent communication hole is 60° or 120°) (see FIG. 5).

The valve stem 41 is formed so that the diameter of the valve stem 41 is reduced stepwise from below. The valve stem 41 includes a lower large-diameter portion 41a that is rotatably and slidably inserted into the insertion hole 17c of the upper cover 17, an intermediate small-diameter portion 41b that protrudes from the upper cover 17 and is rotatably inserted into the motor 20, and an upper engagement portion 41c at which a cut-out portion 48 is formed and which is engaged with an output shaft of the motor 20. O-rings 46 and 47 are mounted in two annular grooves 44 and 45, which are formed on the outer periphery of the lower large-diameter portion 41a so as to be arranged side by side in the longitudinal direction, to seal a slide gap between the insertion hole 17c and the lower large-diameter portion 41a.

When mounting portions 21, which are formed at front and rear portions of the motor 20, are fastened and fixed to mounting portions 18, which are formed at front and rear portions of the valve body 10, by fastening bolts 19, the motor 20 is assembled on the valve body 10. Accordingly, since the output shaft of the motor 20 is engaged with the upper engagement portion 41c (particularly, the cut-out portion 48) of the valve stem 41, the driving force of the motor 20 is transmitted to the valve element 40. Meanwhile, the engagement between the output shaft of the motor 20 and the valve stem 41 may be achieved by any means, such as serrations, without using the cut-out portion 48.

When the cylindrical valve element portion 42 received in the valve chest 11 is at a predetermined angular position (rotational position) in the flow passage switching valve 1 having the above-mentioned structure, as illustrated in FIG. 5, the first inlet (for example, an opening into which heated feed water (tap water) flows) 12a and the first outlet 12c communicate with each other through the communication holes 43a and 43c, which are formed at intervals of 90°, of the valve element 40 and the second inlet (for example, an opening into which non-heated feed water (tap water) flows) 12b and the second outlet 12d are closed by the valve element 40. Fluid, which flows in from the inflow passage 13a of the conduit coupling 14a, (for example, heated feed water (tap water)) is introduced into an internal space of the cylindrical valve element portion 42 through the inlet 12a, the through hole 31a of the seal member 30, and the communication hole 43a of the cylindrical valve element portion 42, and is guided to the outflow passage 13c of the conduit coupling 14c through the communication hole 43c of the cylindrical valve element portion 42, the through hole 31c of the seal member 30, and the outlet 12c (first flow state). Meanwhile, the rotational position of the valve element 40 at this time is referred to as 0°, and a flow passage in which the first inlet 12a and the first outlet 12c communicate with each other through the communication holes is referred to as a first flow passage.

After that, when the motor 20 is driven and rotates the valve element 40 about the axis (counterclockwise when seen from above) by 30°, as illustrated in FIG. 6, the communication holes 43b and 43d different from the above-mentioned communication holes 43a and 43c of the cylindrical valve element portion 42 reach substantially the same positions as the second inlet (for example, an opening into which non-heated feed water (tap water) flows) 12b and the second outlet 12d different from the first inlet 12a and the first outlet 12c, respectively. Accordingly, the second inlet 12b and the second outlet 12d communicate with each other through the communication holes 43b and 43d that are formed at intervals of 90°. In this case, the first inlet (for example, an opening into which heated feed water (tap water) flows) 12a and the first outlet 12c are closed by the valve element 40. Fluid, which flows in from the inflow passage 13b of the conduit coupling 14b, (for example, non-heated feed water (tap water)) is introduced into the internal space of the cylindrical valve element portion 42 through the inlet 12b, the through hole 31b of the seal member 30, and the communication hole 43b of the cylindrical valve element portion 42, and is guided to the outflow passage 13d of the conduit coupling 14d through the communication hole 43d of the cylindrical valve element portion 42, the through hole 31d of the seal member 30, and the outlet 12d (second flow state). A flow passage in which the second inlet 12b and the second outlet 12d communicate with each other through the communication holes is referred to as a second flow passage.

Further, when the motor 20 is driven and rotates the valve element 40 about the axis (counterclockwise when seen from above) by 30° (that is, 60° from the rotational position illustrated in FIG. 5), as illustrated in FIG. 7, the communication holes 43a to 43d of the cylindrical valve element portion 42 reach positions different from the first and second inlets 12a and 12b and the first and second outlets 12c and 12d and openings of all the first and second inlets 12a and 12b and the first and second outlets 12c and 12d are closed by the valve element 40. Accordingly, the first and second flow passages are blocked.

[Second Embodiment]

Figure 8:
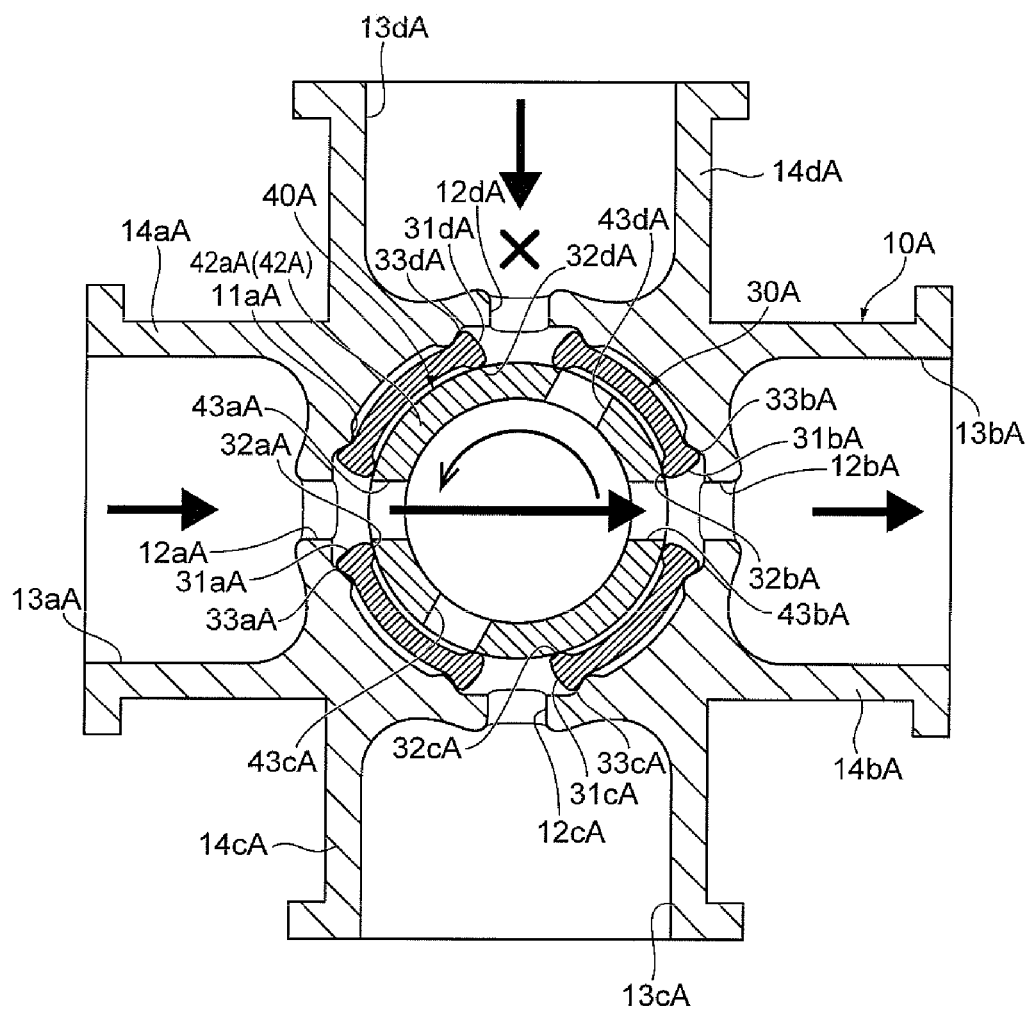
FIG. 8 is a cross-sectional view illustrating a method of switching flow passages by a flow passage switching valve according to a second embodiment of the invention, and is a view illustrating a first flow state.
Figure 9:
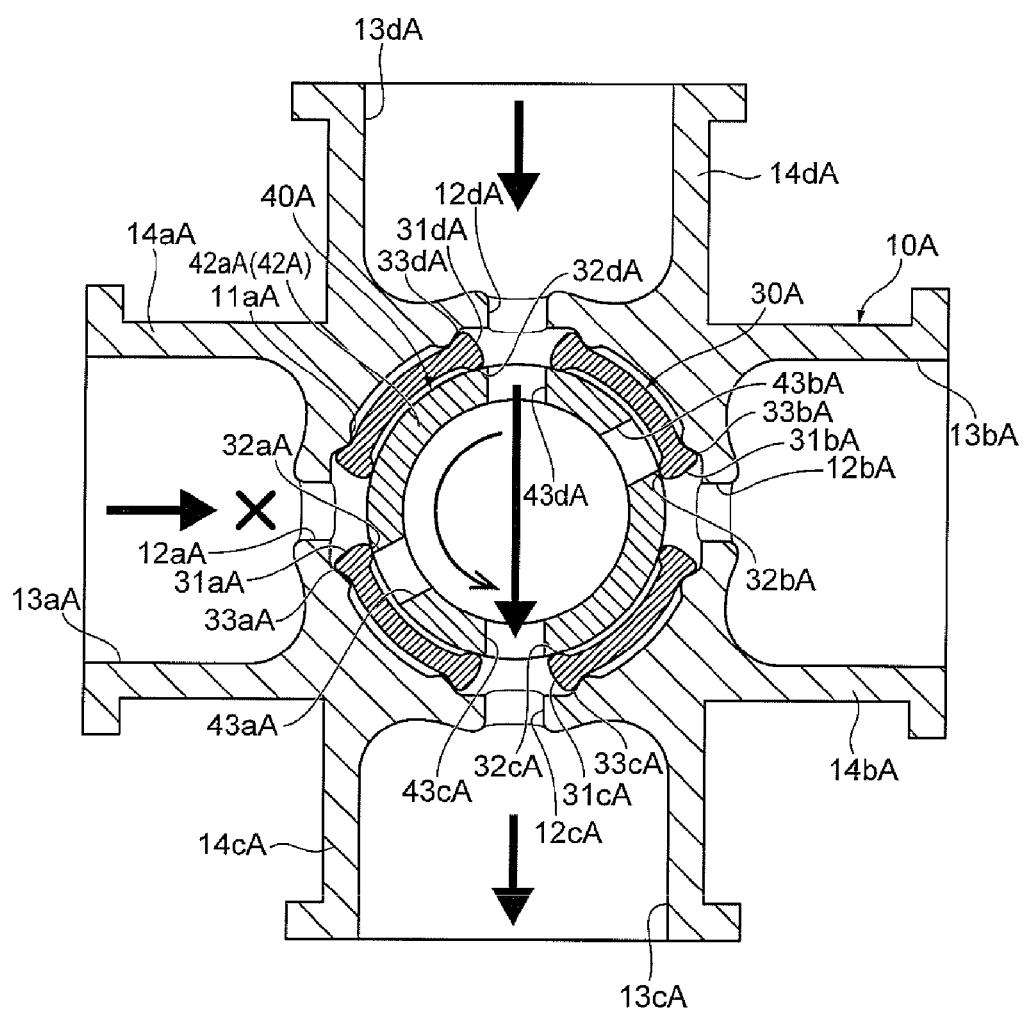
FIG. 9 is a cross-sectional view illustrating the method of switching flow passages by the flow passage switching valve according to the second embodiment of the invention, and is a view illustrating a second flow state.
Figure 10:
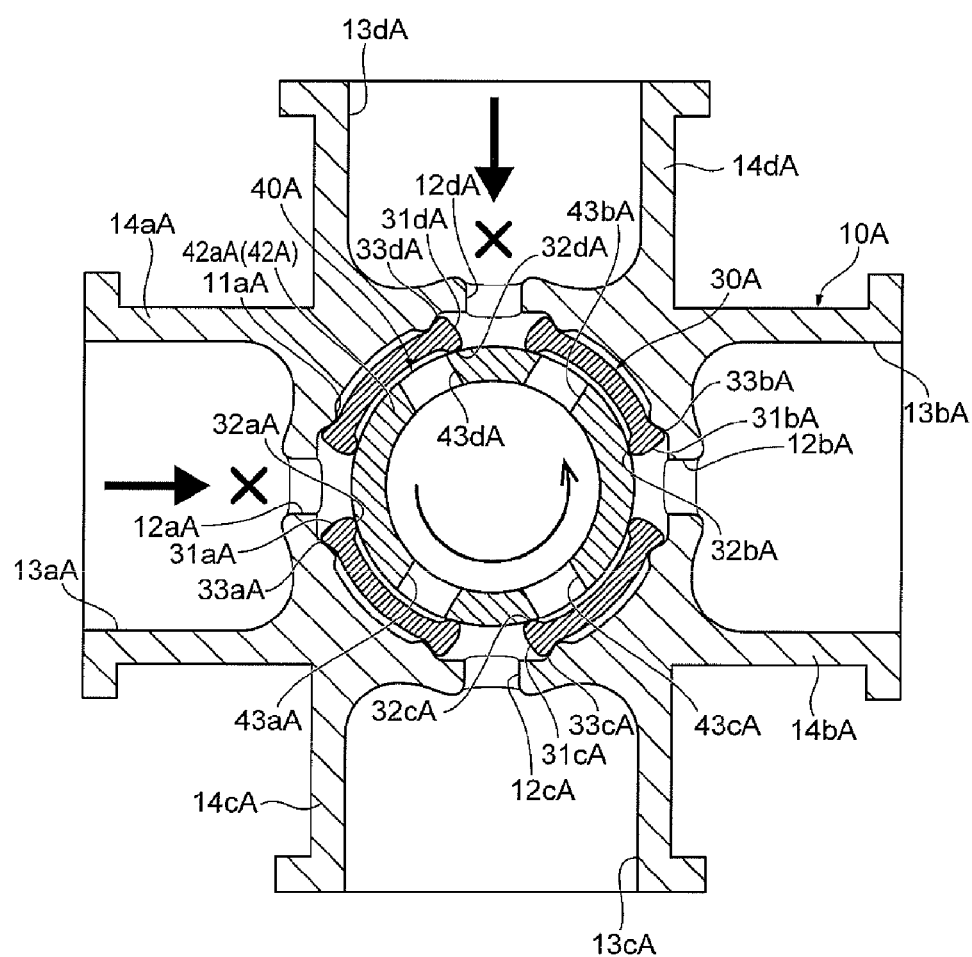
FIG. 10 is a cross-sectional view illustrating the method of switching flow passages by the flow passage switching valve according to the second embodiment of the invention, and is a view illustrating a state in which both flow passages are closed.

FIGS. 8 to 10 are cross-sectional views illustrating a method of switching flow passages by a flow passage switching valve according to a second embodiment of the invention, and are views illustrating a first flow state, a second flow state, and a state in which both flow passages are closed, respectively.

A flow passage switching valve 1A according to the second embodiment illustrated in FIGS. 8 to 10 is different from the flow passage switching valve 1 according to the first embodiment illustrated in FIGS. 1 to 7 mainly in terms of the structure of flow passages of a valve body and the structure of a cylindrical valve element portion of a valve element according to the structure of flow passages, and other structures of the flow passage switching valve 1A are the same as those of the flow passage switching valve 1 according to the first embodiment. Accordingly, the same components as the components of the flow passage switching valve 1 according to the first embodiment will be denoted by the same reference numerals and the detailed description thereof will be omitted.

In the flow passage switching valve 1A according to the second embodiment, among four lateral openings formed at the outer peripheral portion of a valve body 10A, two openings formed at adjacent positions (at angular intervals of 90°) are first and second inlets 12aA and 12dA and first and second outlets 12bA and 12cA, respectively. In other words, two openings formed at positions facing each other (at angular intervals of 180°) are a first inlet 12aA and a first outlet 12bA, which form a first flow passage, and a second inlet 12dA and a second inlet 12cA, which form a second flow passage, respectively.

Further, four communication holes 43aA to 43dA, which are formed at an outer peripheral portion 42aA of a cylindrical valve element portion 42A of a valve element 40A, are formed so that angular intervals between the adjacent communication holes are not equal to each other, in more detail, the angular interval between one communication hole and one adjacent communication hole is 60° and the angular interval between one communication hole and the other adjacent communication hole is 120°. Accordingly, the through holes 43aA and 43bA facing each other are formed at intervals of 180°, and the through holes 43dA and 43cA facing each other are formed at intervals of 180°.

When the cylindrical valve element portion 42A received in a valve chest 11A is at a predetermined angular position in the flow passage switching valve 1A having the above-mentioned structure, as illustrated in FIG. 8, a first inlet (for example, an opening into which heated feed water (tap water) flows) 12aA and the first outlet 12bA communicate with each other through the communication holes 43aA and 43bA, which are formed at intervals of 180°, of the valve element 40A and a second inlet (for example, an opening into which non-heated feed water (tap water) flows) 12dA and the second outlet 12cA are closed by the valve element 40A. Fluid, which flows in from an inflow passage 13aA of a conduit coupling 14aA, (for example, heated feed water (tap water)) is introduced into an internal space of the cylindrical valve element portion 42A through the inlet 12aA, the through hole 31aA of a seal member 30A, and the communication hole 43aA of the cylindrical valve element portion 42A, and is guided to an outflow passage 13bA of a conduit coupling 14bA through the communication hole 43bA of the cylindrical valve element portion 42A, a through hole 31bA of the seal member 30A, and the outlet 12bA (first flow state). Meanwhile, the rotational position of the valve element 40A at this time is referred to as 0°, and a flow passage in which the first inlet 12aA and the first outlet 12bA communicate with each other through the communication holes is referred to as a first flow passage.

After that, when a motor 20A is driven and rotates the valve element 40A about the axis (counterclockwise when seen from above) by 30°, as illustrated in FIG. 9, the communication holes 43dA and 43cA different from the above-mentioned communication holes 43aA and 43bA of the cylindrical valve element portion 42A reach substantially the same positions as the second inlet (for example, an opening into which non-heated feed water (tap water) flows) 12dA and the second outlet 12cA different from the first inlet 12aA and the first outlet 12bA, respectively. Accordingly, the second inlet 12dA and the second outlet 12cA communicate with each other through the communication holes 43dA and 43cA that are formed at intervals of 180°. In this case, the first inlet (for example, an opening into which heated feed water (tap water) flows) 12aA and the first outlet 12bA are closed by the valve element 40A. Fluid, which flows in from an inflow passage 13dA of a conduit coupling 14dA, (for example, non-heated feed water (tap water)) is introduced into the internal space of the cylindrical valve element portion 42A through the inlet 12dA, a through hole 31dA of the seal member 30A, and the communication hole 43dA of the cylindrical valve element portion 42A, and is guided to an outflow passage 13cA of a conduit coupling 14cA through the communication hole 43cA of the cylindrical valve element portion 42A, a through hole 31cA of the seal member 30A, and the outlet 12cA (second flow state). A flow passage in which the second inlet 12dA and the second outlet 12cA communicate with each other through the communication holes is referred to as a second flow passage.

Further, when the motor 20A is driven and further rotates the valve element 40A about the axis (counterclockwise when seen from above) by 30° (that is, 60° from the rotational position illustrated in FIG. 8), as illustrated in FIG. 10, the communication holes 43aA to 43dA of the cylindrical valve element portion 42A reach positions different from the first and second inlets 12aA and 12dA and the first and second outlets 12bA and 12cA and openings of all the first and second inlets 12aA and 12dA and the first and second outlets 12bA and 12cA are closed by the valve element 40A. Accordingly, the first and second flow passages are blocked.

[Third Embodiment]

Figure 11:
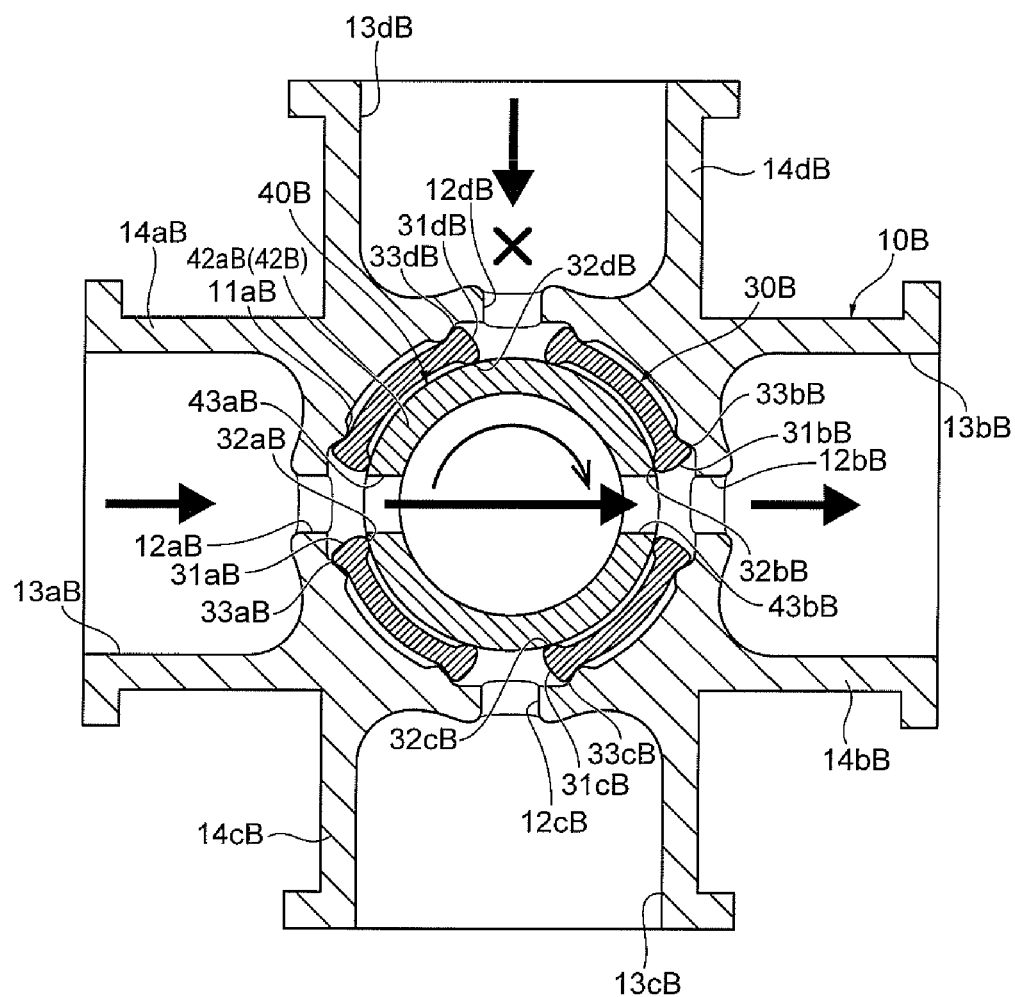
FIG. 11 is a cross-sectional view illustrating a method of switching flow passages by a flow passage switching valve according to a third embodiment of the invention, and is a view illustrating a first flow state.
Figure 12:
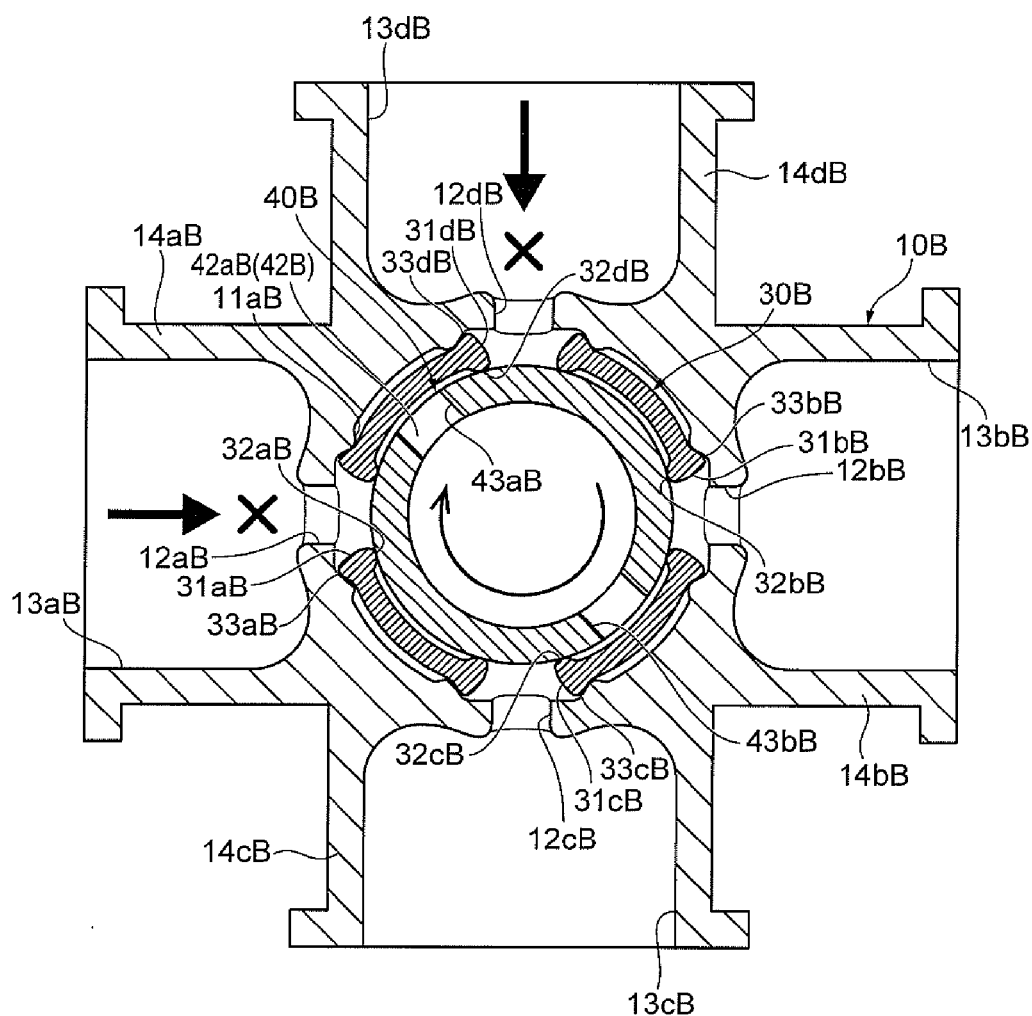
FIG. 12 is a cross-sectional view illustrating the method of switching flow passages by the flow passage switching valve according to the third embodiment of the invention, and is a view illustrating a state in which both flow passages are closed.
Figure 13:
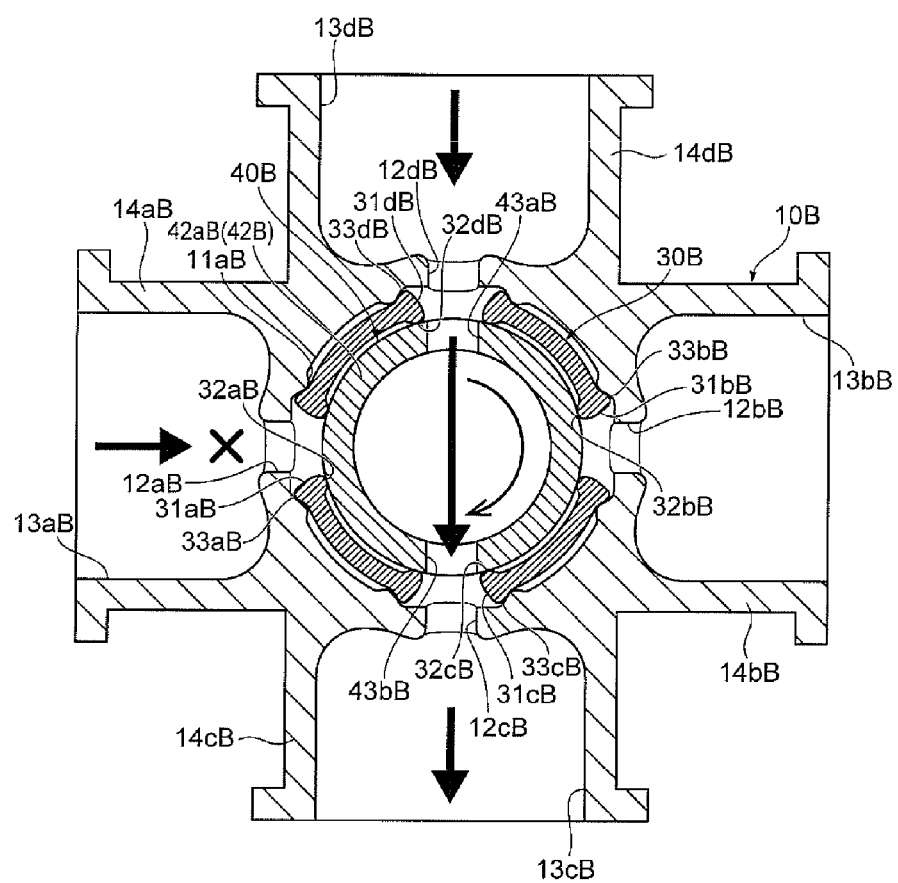
FIG. 13 is a cross-sectional view illustrating the method of switching flow passages by the flow passage switching valve according to the third embodiment of the invention, and is a view illustrating a second flow state.

FIGS. 11 to 13 are cross-sectional views illustrating a method of switching flow passages by a flow passage switching valve according to a third embodiment of the invention, and are views illustrating a first flow state, a state in which both flow passages are closed, and a second flow state, respectively.

A flow passage switching valve 1B according to the third embodiment illustrated in FIGS. 11 to 13 is different from the flow passage switching valve 1A according to the second embodiment illustrated in FIGS. 8 to 10 mainly in terms of the structure of a cylindrical valve element portion of a valve element, and other structures of the flow passage switching valve 1B are the same as those of the flow passage switching valve 1A according to the second embodiment. Accordingly, the same components as the components of the flow passage switching valve 1A according to the second embodiment will be denoted by the same reference numerals and the detailed description thereof will be omitted.

In the flow passage switching valve 1B according to the third embodiment, two communication holes 43aB and 43bB are formed at an outer peripheral portion 42aB of a cylindrical valve element portion 42B of a valve element 40B. Each of the lateral communication holes 43aB and 43bB is smaller than each of through holes 31aB to 31dB of a seal member 30B, and is formed in a vertically long shape of which a length in the axial direction is longer than a length in the circumferential direction, like each of inlets 12aB and 12dB and outlets 12bB and 12cB. Further, the respective communication holes 43aB and 43bB are formed at positions facing each other with respect to the axis, that is, at angular intervals of 180°.

When the cylindrical valve element portion 42B received in a valve chest 11B is at a predetermined angular position in the flow passage switching valve 1B having the above-mentioned structure, as illustrated in FIG. 11, the first inlet (for example, an opening into which heated feed water (tap water) flows) 12aB and the first outlet 12bB communicate with each other through the communication holes 43aB and 43bB, which are formed at intervals of 180°, of the valve element 40B and the second inlet (for example, an opening into which non-heated feed water (tap water) flows) 12dB and the second outlet 12cB are closed by the valve element 40B. Fluid, which flows in from an inflow passage 13aB of a conduit coupling 14aB, (for example, heated feed water (tap water)) is introduced into an internal space of the cylindrical valve element portion 42B through the inlet 12aB, the through hole 31aB of the seal member 30B, and the communication hole 43aB of the cylindrical valve element portion 42B, and is guided to an outflow passage 13bB of a conduit coupling 14bB through the communication hole 43bB of the cylindrical valve element portion 42B, a through hole 31bB of the seal member 30B, and the outlet 12bB (first flow state). Meanwhile, the rotational position of the valve element 40B at this time is referred to as 0°, and a flow passage in which the first inlet 12aB and the first outlet 12bB communicate with each other through the communication holes is referred to as a first flow passage.

After that, when a motor 20B is driven and rotates the valve element 40B about the axis (clockwise when seen from above) by, for example, 45°, as illustrated in FIG. 12, the communication holes 43aB and 43bB of the cylindrical valve element portion 42B reach positions different from the first and second inlets 12aB and 12dB and the first and second outlets 12bB and 12cB and openings of all the first and second inlets 12aB and 12dB and the first and second outlets 12bB and 12cB are closed by the valve element 40B.

Then, when the motor 20B is driven and further rotates the valve element 40B about the axis (clockwise when seen from above) by 45° (that is, 90° from the rotational position illustrated in FIG. 11), as illustrated in FIG. 13, the above-mentioned communication holes 43aB and 43bB of the cylindrical valve element portion 42B reach substantially the same positions as the second inlet (for example, an opening into which non-heated feed water (tap water) flows) 12dB and the second outlet 12cB different from the first inlet 12aB and the first outlet 12bB, respectively. Accordingly, the second inlet 12dB and the second outlet 12cB communicate with each other through the communication holes 43aB and 43bB. In this case, the first inlet (for example, an opening into which heated feed water (tap water) flows) 12aB and the first outlet 12bB are closed by the valve element 40B. Fluid, which flows in from an inflow passage 13dB of a conduit coupling 14dB, (for example, non-heated feed water (tap water)) is introduced into the internal space of the cylindrical valve element portion 42B through the inlet 12dB, a through hole 31dB of the seal member 30B, and the communication hole 43aB of the cylindrical valve element portion 42B, and is guided to an outflow passage 13cB of a conduit coupling 14cB through the communication hole 43bB of the cylindrical valve element portion 42B, a through hole 31cB of the seal member 30B, and the outlet 12cB (second flow state). A flow passage in which the second inlet 12dB and the second outlet 12cB communicate with each other through the communication holes is referred to as a second flow passage.

[Fourth Embodiment]

Figure 14:
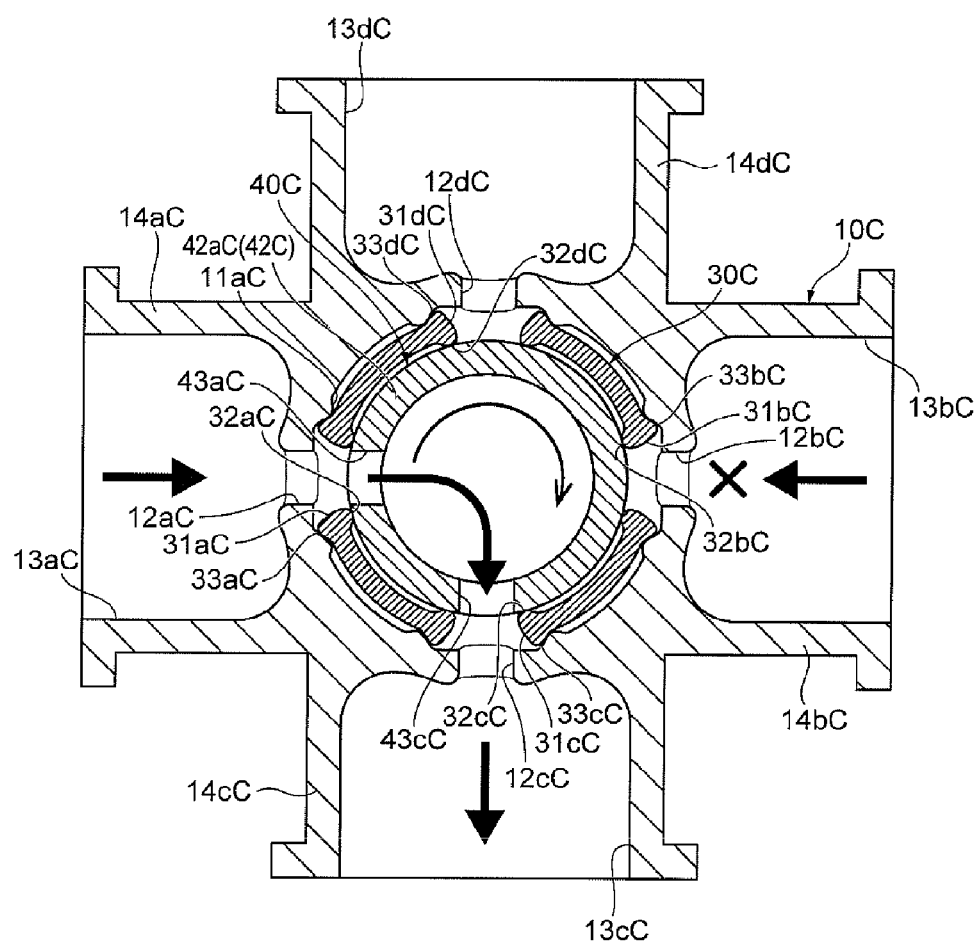
FIG. 14 is a cross-sectional view illustrating a method of switching flow passages by a flow passage switching valve according to a fourth embodiment of the invention, and is a view illustrating a first flow state.
Figure 15:
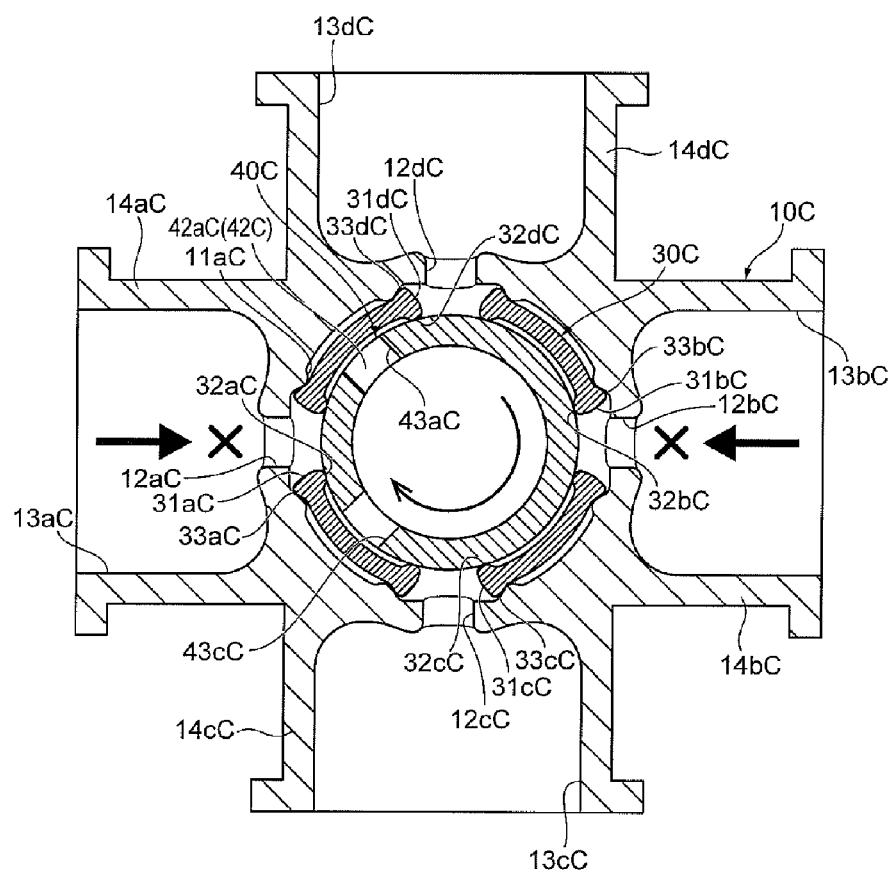
FIG. 15 is a cross-sectional view illustrating the method of switching flow passages by the flow passage switching valve according to the fourth embodiment of the invention, and is a view illustrating a state in which both flow passages are closed.
Figure 16:
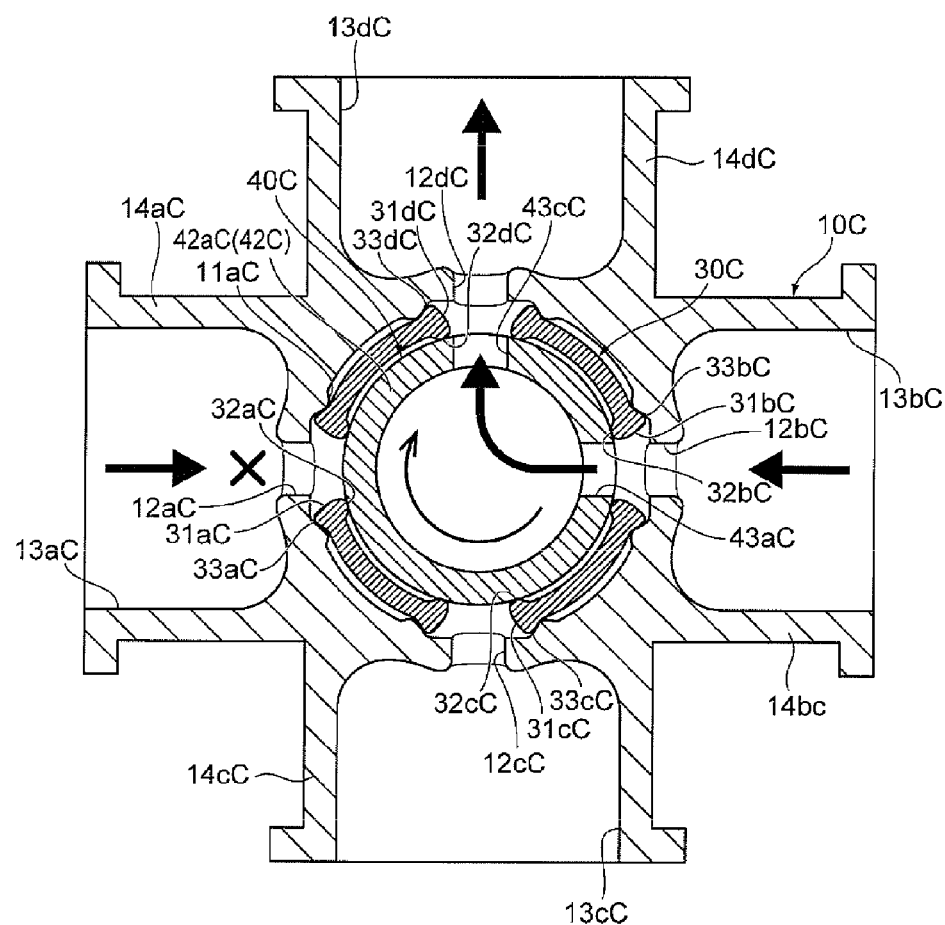
FIG. 16 is a cross-sectional view illustrating the method of switching flow passages by the flow passage switching valve according to the fourth embodiment of the invention, and is a view illustrating a second flow state.
Figure 17:
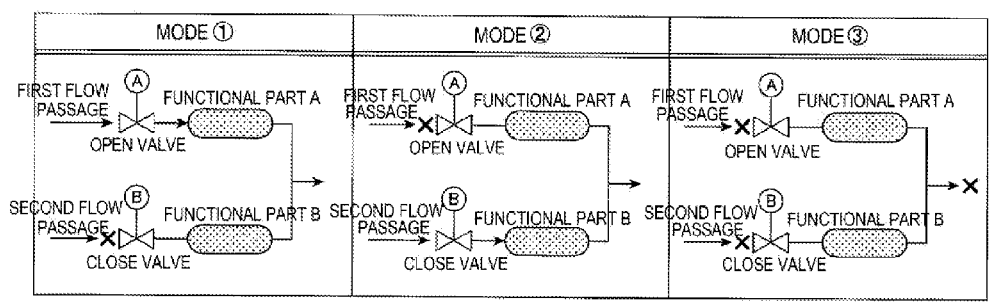
FIG. 17 is a diagram illustrating a hot-water supply system in the related art that is provided with a plurality of flow passages.

FIGS. 14 to 16 are cross-sectional views illustrating a method of switching flow passages by a flow passage switching valve according to a fourth embodiment of the invention, and are views illustrating a first flow state, a state in which both flow passages are closed, and a second flow state, respectively.

A flow passage switching valve 1C according to the fourth embodiment illustrated in FIGS. 14 to 16 is different from the flow passage switching valve 1 according to the first embodiment illustrated in FIGS. 1 to 7 mainly in terms of the structure of a cylindrical valve element portion of a valve element, and other structures of the flow passage switching valve 1C are the same as those of the flow passage switching valve 1 according to the first embodiment. Accordingly, the same components as the components of the flow passage switching valve 1 according to the first embodiment will be denoted by the same reference numerals and the detailed description thereof will be omitted.

In the flow passage switching valve 1C according to the fourth embodiment, two communication holes 43aC and 43cC are formed at an outer peripheral portion of a cylindrical valve element portion 42C of a valve element 40C. Each of the lateral communication holes 43aC and 43cC is smaller than each of through holes 31aC to 31dC of a seal member 30C, and is formed in a vertically long shape of which a length in the axial direction is longer than a length in the circumferential direction, like each of inlets 12aC and 12bC and outlets 12cC and 12dC. Further, the respective communication holes 43aC and 43cC are formed at angular intervals of 90°.

When the cylindrical valve element portion 42C received in a valve chest 11C is at a predetermined angular position in the flow passage switching valve 1C having the above-mentioned structure, as illustrated in FIG. 14, the first inlet (for example, an opening into which heated feed water (tap water) flows) 12aC and the first outlet 12cC communicate with each other through the communication holes 43aC and 43cC, which are formed at intervals of 90°, of the valve element 40C and the second inlet (for example, an opening into which non-heated feed water (tap water) flows) 12bC and the second outlet 12dC are closed by the valve element 40C. Fluid, which flows in from an inflow passage 13aC of a conduit coupling 14aC, (for example, heated feed water (tap water)) is introduced into an internal space of the cylindrical valve element portion 42C through the inlet 12aC, the through hole 31aC of the seal member 30C, and the communication hole 43aC of the cylindrical valve element portion 42C, and is guided to an outflow passage 13cC of a conduit coupling 14cC through the communication hole 43cC of the cylindrical valve element portion 42C, a through hole 31cC of the seal member 30C, and the outlet 12cC (first flow state). Meanwhile, the rotational position of the valve element 40C at this time is referred to as 0°, and a flow passage in which the first inlet 12aC and the first outlet 12cC communicate with each other through the communication holes is referred to as a first flow passage.

After that, when a motor 20C is driven and rotates the valve element 40C about the axis (clockwise when seen from above) by, for example, 45°, as illustrated in FIG. 15, the communication holes 43aC and 43cC of the cylindrical valve element portion 42C reach positions different from the first and second inlets 12aC and 12bC and the first and second outlets 12cC and 12dC and openings of all the first and second inlets 12aC and 12bC and the first and second outlets 12cC and 12dC are closed by the valve element 40C.

Then, when the motor 20C is driven and further rotates the valve element 40C about the axis (clockwise when seen from above) by 135° (that is, 180° from the rotational position illustrated in FIG. 14), as illustrated in FIG. 16, the above-mentioned communication holes 43aC and 43cC of the cylindrical valve element portion 42C reach substantially the same positions as the second inlet (for example, an opening into which non-heated feed water (tap water) flows) 12bC and the second outlet 12dC different from the first inlet 12aC and first outlet 12cC, respectively. Accordingly, the second inlet 12bC and the second outlet 12dC communicate with each other through the communication holes 43aC and 43cC. In this case, the first inlet (for example, an opening into which heated feed water (tap water) flows) 12aC and the first outlet 12cC are closed by the valve element 40C. Fluid, which flows in from an inflow passage 13bC of a conduit coupling 14bC, (for example, non-heated feed water (tap water)) is introduced into the internal space of the cylindrical valve element portion 42C through the inlet 12bC, a through hole 31bC of the seal member 30C, and the communication hole 43aC of the cylindrical valve element portion 42C, and is guided to an outflow passage 13dC of a conduit coupling 14dC through the communication hole 43cC of the cylindrical valve element portion 42C, a through hole 31dC of the seal member 30C, and the outlet 12dC (second flow state). A flow passage in which the second inlet 12bC and the second outlet 12dC communicate with each other through the communication holes is referred to as a second flow passage.

As described above, in the flow passage switching valves 1 to 1C according to the first to fourth embodiments, it is possible to switch the first flow passage in which the first inlet and the first outlet formed at the valve body communicate with each other through the communication holes of the valve element and the second flow passage in which the second inlet and the second outlet communicate with each other through the communication holes of the valve element, according to the change of the rotational position of the valve element, by rotating the valve element to an appropriate position through the drive of the motor. Accordingly, it is possible to individually perform the flow control of flow passages of a system, such as a hot-water supply system, which is provided with the plurality of flow passages, by a simple structure.

In more detail, the first inlet, the first outlet, and two communication holes selected from the plurality of communication holes, and the second inlet, the second outlet, and two communication holes formed of communication holes, which are selected from the plurality of communication holes and are the same as or different from the two communication holes, are formed at the same angular interval in the circumferential direction. When the first inlet and the first outlet communicate with each other through the two communication holes, the second inlet and the second outlet are closed by the cylindrical valve element portion of the valve element. When the valve element is rotated to a predetermined rotational position, the first inlet and the first outlet are closed by the cylindrical valve element portion of the valve element and the second inlet and the second outlet, which are different from the first inlet and the first outlet, communicate with each other through two communication holes formed of communication holes that are the same as or different from the two communication holes. Accordingly, it is possible to reliably switch each flow passage of a system, such as a hot-water supply system, which is provided with the plurality of flow passages, by a simple structure.

Further, the communication holes, which are formed at the cylindrical valve element portion of the valve element, and the first and second inlets and the first and second outlets, which are formed at the valve body, are formed in a vertically long shape of which a length in an axial direction is longer than a length in a circumferential direction. Accordingly, even when the first and the second flow passages are switched, it is possible to make the first inlet and the first outlet of the first flow passage reliably communicate with each other and to make the second inlet and the second outlet of the second flow passage reliably communicate with each other. As a result, it is possible to reliably perform the flow control of each flow passage.

Furthermore, there is also an advantage capable of quickly performing the flow control of each flow passage of a system, such as a hot-water supply system, which is provided with a plurality of flow passages, by switching the first and second flow passages with a relatively small rotation angle (for example, 30°) as in, for example, first and second embodiments.

Meanwhile, aspects in which four openings (the first and second inlets and the first and second outlets) are formed at the outer peripheral portion of the valve body at regular intervals have been described in the above-mentioned first to fourth embodiments, but the openings do not necessarily need to be formed at regular intervals. Further, the outer peripheral portion of the valve body has only to be provided with at least the first inlet and the first outlet forming the first flow passage and the second inlet and the second outlet forming the second flow passage, that is, the outer peripheral portion of the valve body has only to be provided with two or more flow passages, each of which includes an inlet and an outlet.

Furthermore, needless to say, the positions and the number of the communication holes, which are formed at the cylindrical valve element portion of the valve element, the size of each communication hole, and the like can be appropriately selected as long as each flow passage is appropriately switched according to the change of the rotational position of the valve element. For example, two or four communication holes have been formed in the above-mentioned first to fourth embodiments, but the number of the communication holes may be an even number that is equal to or larger than six, and may be an odd number that is equal to or larger than three. For example, if three communication holes are formed, the second inlet and the second outlet are closed by the cylindrical valve element portion of the valve element when the first inlet and the first outlet communicate with each other through two communication holes selected from the three communication holes. When the valve element is rotated to a predetermined rotational position, the first inlet and the first outlet are closed by the cylindrical valve element portion of the valve element and the second inlet and the second outlet have only to communicate with each other through two communication holes that is formed of one of the two communication holes and the other except for the two communication holes.

Further, the seal member, which is formed of one annular member and on which the inner and outer ribs are formed integrally, has been employed in each of the above-mentioned first to fourth embodiments in order to further reduce the number of parts and manufacturing man-hours. However, as long as the leakage of fluid between the valve chest and each of the inlet and outlet can be suppressed, an arbitrary seal member (for example, a seal member formed of a plurality of components) can be employed.

Furthermore, in the above-mentioned first to fourth embodiments, protrusions have been formed on the inner wall surface of the valve body and have been made to come into contact with the outer peripheral sides of the respective outer ribs of the seal member, in order to prevent the rotation of the seal member caused by the rotation of the valve element. However, an appropriate structure may be employed as a structure for preventing the rotation of the seal member. For example, convex protrusions or concave recesses may be formed on the seal member, and recesses or protrusions corresponding to the convex protrusions or concave recesses may be formed on the inner wall surface forming the valve chest as stoppers.

Moreover, it is natural that the flow passage switching valves according to the above-mentioned first to fourth embodiments can be employed as flow passage switching devices of various equipments, such as a flow passage switching valve for switching a flow passage for fluid flowing in an engine room of an automobile or the like, other than the above-mentioned hot-water supply system.

What is claimed is:

1. A flow passage switching valve comprising:
   a valve body that includes a valve chest formed therein and first and second inlets and first and second outlets communicating with the valve chest and formed at an outer peripheral portion thereof;
   a valve element including a cylindrical valve element portion that is rotatably received in the valve chest and includes first to fourth communication holes formed at an outer peripheral portion thereof in a circumferential direction; and
   a rotating drive unit that rotates the valve element about an axis thereof,
   wherein a first flow passage is defined by the first inlet and the first outlet communicating with each other through the first and second communication holes and a second flow passage is defined by the second inlet and the second outlet communicating with each other through the third and fourth communication holes;

the first flow passage and the second flow passage are arranged orthogonally to each other;

the first and second communication holes are provided in an angular interval of 60 degrees or 120 degrees with respect to the third and fourth communication holes in the circumferential direction;

the first and second flow passages are switched according to a change of a rotational position of the valve element.

2. The flow passage switching valve according to claim 1, wherein the first inlet, the first outlet, and the first and second communication holes are provided at the same angular interval in the circumferential direction, and the second inlet, the second outlet, third and fourth communication holes are provided at the same angular interval in the circumferential direction.

3. The flow passage switching valve according to claim 1, wherein the first to fourth communication holes, and/or the first and second inlets and the first and second outlets are formed in a vertically long shape of which a length in an axial direction is longer than a length in the circumferential direction.

4. The flow passage switching valve according to claim 1, wherein a seal member is provided between the cylindrical valve element portion and the valve body.

5. The flow passage switching valve according to claim 4, wherein the seal member is formed of one annular member that includes through holes formed at positions corresponding to the first and second inlets and the first and second outlets.

6. The flow passage switching valve according to claim 5, wherein outer ribs are formed on the seal member along peripheries of the through holes so as to protrude outward from the outer peripheral surface of the seal member, and protrusions, which come into contact with the outer ribs, are provided on an inner wall surface of the valve body.

\* \* \* \* \*